United States Patent
Kikuchi (10) Patent No.: US 7,616,357 B2
(45) Date of Patent: Nov. 10, 2009

(54) IMAGE PROCESSING APPARATUS, METHOD FOR CONTROLLING IMAGE PROCESSING APPARATUS

(75) Inventor: Akitoshi Kikuchi, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/531,075

(22) Filed: Sep. 12, 2006

(65) Prior Publication Data
US 2007/0058218 A1    Mar. 15, 2007

(30) Foreign Application Priority Data
Sep. 14, 2005   (JP)   .............................. 2005-267690

(51) Int. Cl.
H04N 1/04    (2006.01)
H04N 1/387   (2006.01)
G06K 9/32    (2006.01)
(52) U.S. Cl. .................. 358/486; 358/453; 382/299
(58) Field of Classification Search ............. 358/474, 358/448
See application file for complete search history.

(56) References Cited

U.S. PATENT DOCUMENTS

| | | | | |
|---|---|---|---|---|
| 3,501,623 A * | 3/1970 | Robinson | ................. | 382/299 |
| 3,502,803 A * | 3/1970 | Buddendeck et al. | ....... | 358/486 |
| 4,409,622 A * | 10/1983 | Watanabe | ................ | 358/410 |
| 5,296,939 A * | 3/1994 | Suzuki | ................... | 358/453 |
| 5,719,968 A * | 2/1998 | Hashimoto et al. | ......... | 382/288 |
| 6,016,205 A * | 1/2000 | Silverberg et al. | .......... | 358/1.6 |
| 6,307,974 B1 * | 10/2001 | Tsujimoto | .................. | 382/239 |
| 2003/0161435 A1 * | 8/2003 | Ozaki | ......................... | 378/4 |
| 2004/0212852 A1 * | 10/2004 | Lee | ............................. | 358/488 |

FOREIGN PATENT DOCUMENTS

JP         10-42156        2/1998

\* cited by examiner

*Primary Examiner*—Mark K Zimmerman
*Assistant Examiner*—Mesfin Getaneh
(74) *Attorney, Agent, or Firm*—Fitzpatrick, Cella, Harper & Scinto (57) ABSTRACT

A scanner unit 105 of an MFP 100 performs prescanning and generates white area determination data 301. Next, at the scanning operation, the scanner unit 105 refers to the white area determination data 301 to detect a white stripe. In this area, a motor is driven at high speed.

13 Claims, 10 Drawing Sheets

IMAGE PROCESSING APPARATUS, METHOD FOR CONTROLLING IMAGE PROCESSING APPARATUS

BACKGROUND OF THE INVENTION

1. Field of the Invention

The present invention relates to a technique for efficiently scanning an image in an image processing apparatus including an image scanning unit.

2. Description of the Related Art

Currently multifunction printers (MFPS) including scanner units and printer units are widely available as image processing apparatuses. The scanner head of a scanner unit in an MFP includes an image sensor such as a CCD and a CIS (contact image sensor). The printer unit of an MFP includes an inkjet printer or a laser printer.

An image processing circuit or the CPU of an MFP performs image processing on digital image data having been generated by scanning an image through the scanner unit of the MFP, and a printer unit prints the image using the processed digital image data. The MFP thus realizes a copy function.

An MFP generally includes memory in which three areas are allocated as an input buffer for storing digital image data, an image processing memory for image processing, and an output buffer for storing output data for printing.

Currently MFPs including inkjet printers as printer units have rapidly become widespread because MFPs are relatively small in size with low noise and can perform color copying, printing, and scanning at low cost. In recent years, MFPs have rapidly advanced in image quality and speed and thus an A4-sized image can be copied in about one minute with quality equivalent to a photograph.

However, the users and so on have demanded MFPs enabling high-speed and high-quality scanning of images. In response to the need, Japanese Patent Application Laid-Open No. 10-41256 discloses a technique enabling high-speed processing which is achieved by omitting image processing on a white area of a scanned image.

A color image processing apparatus of Japanese Patent Application Laid-Open No. 10-42156 includes white area determining means which determines a white area of an image represented by image data and image processing means for performing different image processing between on an area which has been determined as the white area by the white area determining means and on an area other than the white area. Furthermore, the image processing apparatus includes printing means for printing an image based on image data having been processed by the image processing means. The printing means performs printing while skipping the white area.

For example, the image processing means further omits a change of luminance/density and masking on an area determined as a white area.

For example, when the density level is zero as a result of density correction, the image processing means further omits scaling processing, error-diffusion processing, and masking processing on a white area.

Moreover, according to the color image processing apparatus of Japanese Patent Application Laid-Open No. 10-41256, most color image processing is performed by software. Thus it is possible to reduce the number of components, the size and cost of the apparatus, and an amount of processing of color image information to be processed.

However, according to the color image processing apparatus and method of Japanese Patent Application Laid-Open No. 10-41256, most image processing is performed, as described above, by software in order to reduce the size and cost of the apparatus.

Although the omission of image processing on a white area of a scanned image is considered, motor control for moving a scanner head so as to skip the white area at high speed is not considered. For this reason, also in a scan of an image including many white areas, the traveling speed of the scanner head results in a bottleneck, so that the speed of processing cannot be expected to dramatically increase.

For these reasons, the prior art cannot to respond to the need for even higher scanning speed.

The present invention is designed in view of such circumstances. A feature of the present invention is to provide a technique for scanning an image at higher speed.

The image includes a text image unless otherwise specified.

SUMMARY OF THE INVENTION

It is a feature of the present invention to solve the conventional problems.

According to an aspect of the present invention, there is provided an image processing apparatus for scanning an image printed on an original and performing image processing, comprising: a scanner having at least a scanning width corresponding to a width in a first direction of the original, a moving unit adapted to move the scanner in a second direction perpendicular to the first direction, a first scan control unit adapted to control the scanner and the moving unit to control a scanning operation such that the image is scanned with a first resolution, for each of a plurality of blocks obtained by dividing the image into the predetermined size blocks in the first direction and the second direction, a first determination unit adapted to determine whether an image in each of the plurality of blocks is a blank or not, the blocks having been scanned under control of the first scan control unit, a second determination unit adapted to determine, based on a determination result of the first determination unit, whether the plurality of blocks include a blank stripe in which blocks in the first direction are all blank, a storage unit adapted to store determination results of the first and second determination units, and a second scan control unit adapted to control the scanning operation such that the image is scanned with a second resolution higher than the first resolution while the moving unit moves the scanner at high speed with skipping image scanning on the blank stripe based on the determination result of the second determination unit, the determination result being stored in the storage unit.

According to another aspect of the present invention, there is provided a control method for controlling an image processing apparatus for scanning an image printed on a medium while causing a moving unit to move a scanner in a second direction perpendicular to a first direction, the scanner having at least a scanning width corresponding to a width in the first direction of the medium, the method comprising the steps of: controlling the scanner and the moving unit to control a scanning operation such that the image is scanned with a first resolution, for each of a plurality of blocks obtained by dividing the image into the predetermined size blocks in the first direction and the second direction, determining whether an image in each of the plurality of blocks is a blank or not, the blocks having been scanned by the scanning operation, determining, based on the determination result, whether the plurality of blocks include a blank stripe in which blocks in the first direction are all blank, storing determination results of the two determination steps in memory, and controlling the scanning operation such that the image is scanned with a second resolution higher than the first resolution while the moving unit moves the scanner at high speed with skipping image scanning on the blank stripe based on the determination results stored in the memory.

According to another aspect of the present invention, there is provided a computer program, stored in a computer-readable storage medium, for causing a computer to perform a control method for controlling an image processing apparatus for scanning an image printed on a medium while causing a moving unit to move a scanner in a second direction perpendicular to a first direction, the scanner having at least a scanning width corresponding to a width in the first direction of the medium, the computer program comprising: a module for controlling the scanner and the moving unit to control a scanning operation such that the image is scanned with a first resolution, for each of a plurality of blocks obtained by dividing the image into the predetermined size blocks in the first direction and the second direction, a module for determining whether an image in each of the plurality of blocks is a blank or not, the blocks having been scanned by the scanning operation, a module for determining, based on the determination result, whether the plurality of blocks include a blank stripe in which blocks in the first direction are all blank, a module for storing determination results of the two determination modules in memory, and a module for controlling the scanning operation such that the image is scanned with a second resolution higher than the first resolution while the moving unit moves the scanner at high speed with skipping image scanning on the blank stripe based on the determination results stored in the memory.

This summary of the invention does not necessarily describe all necessary features so that the invention may also be a sub-combination of these described features.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The following will describe embodiments of the present invention with reference to the accompanying drawings. The individual embodiments described below will be useful for understanding various concepts including the superordinate concept, the intermediate concept, and the subordinate concept of the present invention.

The technical scope of the present invention is defined by claims and is not limited by the individual embodiments described below. Further, the combinations of features described in the embodiments are not all essential for the solution of the invention.

First Embodiment

<The configuration of MFP 100>

Figure 1:
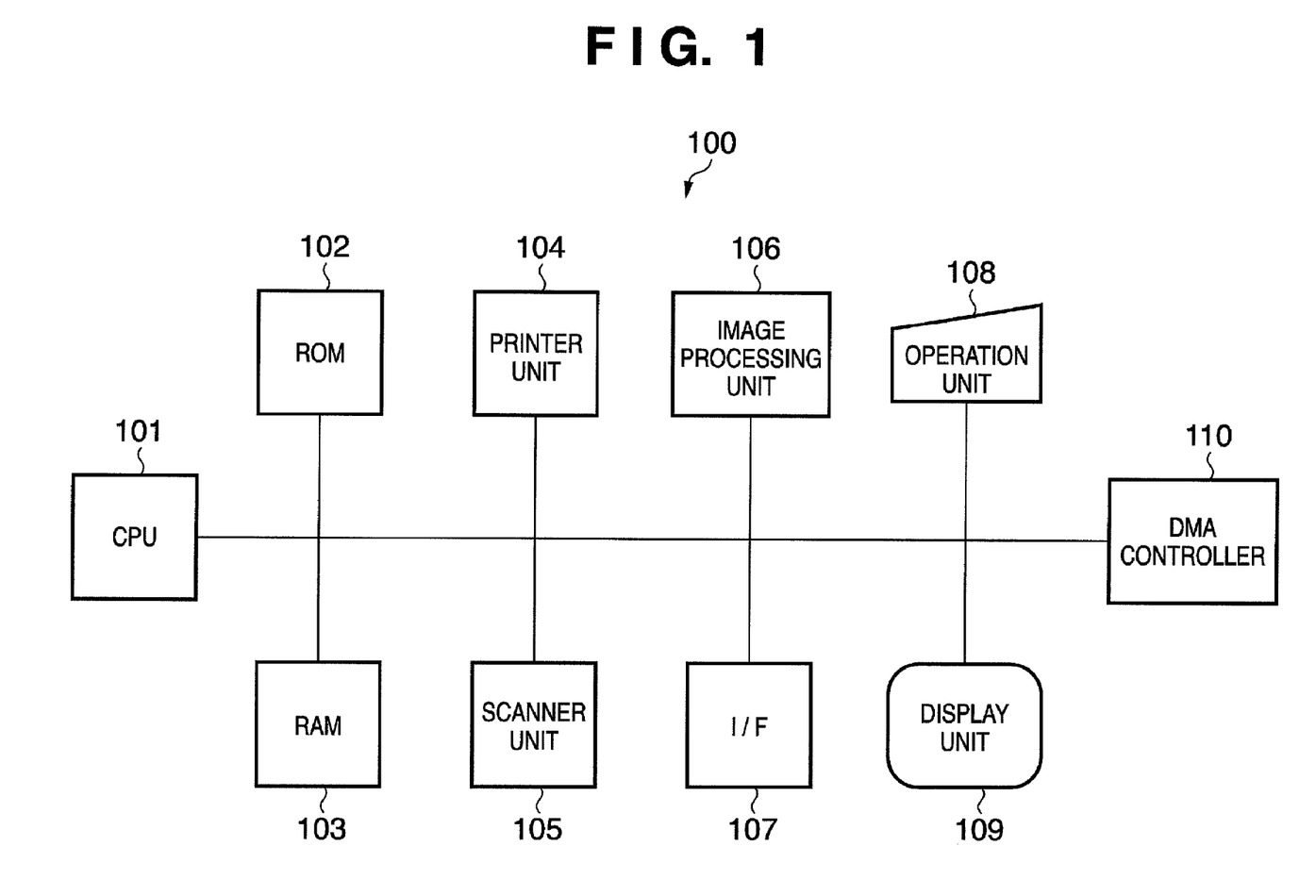
FIG. 1 is a functional block diagram showing the configuration of a multifunction printer (MFP) which is an example of an image processing apparatus to which the present invention can be applied.

FIG. 1 is a functional block diagram showing the configuration of a multifunction printer (MFP 100) which is an example of an image processing apparatus to which the present invention can be applied.

A CPU 101 is a processor for controlling the overall MFP 100. The MFP 100 is controlled by running a program (firmware) stored in ROM 102.

The ROM 102 is nonvolatile memory for storing the program for controlling the MFP 100.

RAM 103 is nonvolatile memory which is used as a work area when the CPU 101 runs the program stored in the ROM 102. The RAM 103 is also used as buffer memory for temporarily storing image data having been scanned by a scanner unit 105.

A printer unit 104 prints image data on a sheet of paper, an OHP sheet, and so on (hereinafter, will be referred to as a "printing medium"). In the present embodiment, the printer unit 104 is an inkjet printer which includes a printhead, a motor, and an ink cartridge. The printer unit 104 causes a carriage having the printhead to scan on the printing medium in a reciprocating manner and apply ink to the printing medium. Printing is performed by transporting the printing medium according to the scanning perpendicularly to the scanning direction of the carriage.

The scanner unit 105 scans images represented on a sheet of paper, a plastic sheet, a film, and so on (hereinafter, will be referred to as a "original") and generates image data. The scanner unit 105 temporarily buffers, in the RAM 103, image data having been generated by scanning images.

The scanner unit 105 includes a scanner head which has a scanning width corresponding to the overall width of the largest readable original (for example, A4-size paper). In the scanner head, a plurality of CCDs (or CISs) are arranged in the scanning width direction. Image data is obtained by electrically scanning the CCDs. Further, the scanner head is mechanically scanned by the motor perpendicularly to the arrangement direction of the CCDs. The images of the overall original can be scanned by combining the electrical scanning and the mechanical scanning. In this case, the direction of electrical scanning is called "main scanning direction" and the direction of mechanical scanning is called "sub scanning direction."

The scanner unit 105 scans images and generates color image data. The color image data is image data in which color components including RGB (red, green, blue) components are represented in, for example, 8 bits (0 to 255). The number of bits representing each pixel can be freely set within the range of the capability of the CCDs or CISs. The number of bits is called "color depth."

An image processing unit 106 performs digital image processing such as color correction and filter processing on image data having been buffered in the RAM 103 by the scanner unit 105.

An I/F 107 is an interface for allowing the MFP 100 to communicate with various external devices. The external devices include, for example, a personal computer (PC) and a drive for reading and writing data in a storage medium such as a memory card. The kind of interface includes USB and IEEE1394.

An operation unit 108 is operated by the user to provide the MFP 100 with various instructions. A possible instruction includes, for example, a copy instruction for causing the printer unit 104 to perform printing based on image data having been scanned and generated by the scanner unit 105. The instruction to the MFP 100 may be provided from a PC or the like through the I/F 107.

A display unit 109 notifies the user of various information, and is made up of an LCD, an LED, and so on. The information provided to the user includes, for example, a state of the MFP 100 (printing, idling, and so on) and the setting menu of the MFP 100.

A DMA controller 110 is a controller for transferring data between the constituent elements of the MFP 100 through DMA transfer.

<Prescanning>

In the present embodiment, the MFP 100 performs prescanning in order that the scanner unit 105 can scan images at higher speed. Prescanning is scanning of images from an original with a relatively low resolution and color depth. Since prescanning is low in resolution and color depth, images can be scanned at a relatively high speed.

In the present embodiment, the MFP 100 detects a white area of the original by prescanning. The white area means that pixels in a predetermined area are all white in the original. Strictly saying, "white" means that all the pixels of RGB components have the maximum values (for example, 31 for 4 bits) in generated image data. In consideration of human visual characteristics, a pixel exceeding a predetermined threshold value may be regarded as "white."

Since the image processing unit 106 does not have to perform image processing on a white area, the detection of a white area contributes to faster scanning (hereinafter, will be referred to as "actual scanning") which is performed with a relatively high resolution and color depth after prescanning.

Further, when all the areas are white in the main scanning direction, the areas can be skipped in sub scanning. The speed of the scanner head of the scanner unit 105 can be increased at this point, further increasing the speed of actual scanning.

Figure 2:
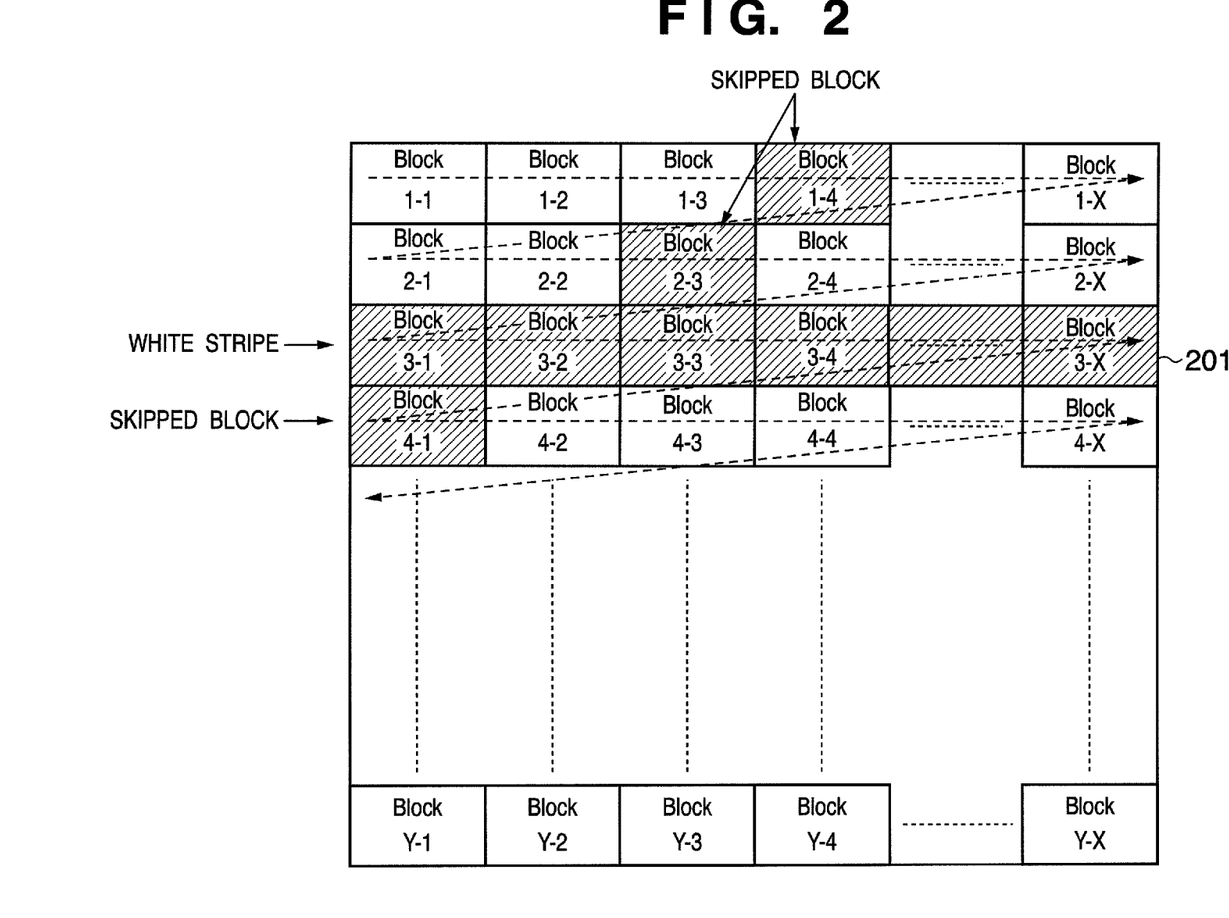
FIG. 2 is a diagram showing an example of prescan image data detected by prescanning.

FIG. 2 is a diagram showing an example of prescan image data 201 generated by prescanning. The prescan image data 201 is made up of multiple pieces of block data which represents a plurality of block images obtained by dividing, when an image is scanned, the image into X in the main scanning direction of the scanner head and Y in the sub scanning direction of the scanner head. The number of divided blocks and the size of each block do not change during prescanning and actual scanning. Each block has a predetermined size in the main scanning direction and the sub scanning direction. The prescan image data 201 is divided into blocks of predetermined size. This is because unless the presence of a white area is determined over a somewhat wide range, the omission of image processing performed by the image processing unit 106 and the control of the scanner head become complicated and adversely affect the speedup of the scanning.

In FIG. 2, diagonally shaded areas indicate white areas. The white areas are represented as "skipped blocks" in FIG. 2. In these areas, it is possible to omit image processing performed by the image processing unit 106 on image data obtained by actual scanning. When it is determined that blocks in the main scanning direction are all white areas, the blocks are represented as a "white stripe" in FIG. 2. In these areas, the speed of the scanner head is increased during sub scanning for actual scanning, so that these areas can be skipped at high speed. In this case, the "stripe" means a group of all blocks arranged in the main scanning direction.

<White Area Determination Data 301 and Actual Scanning>

Figure 3:
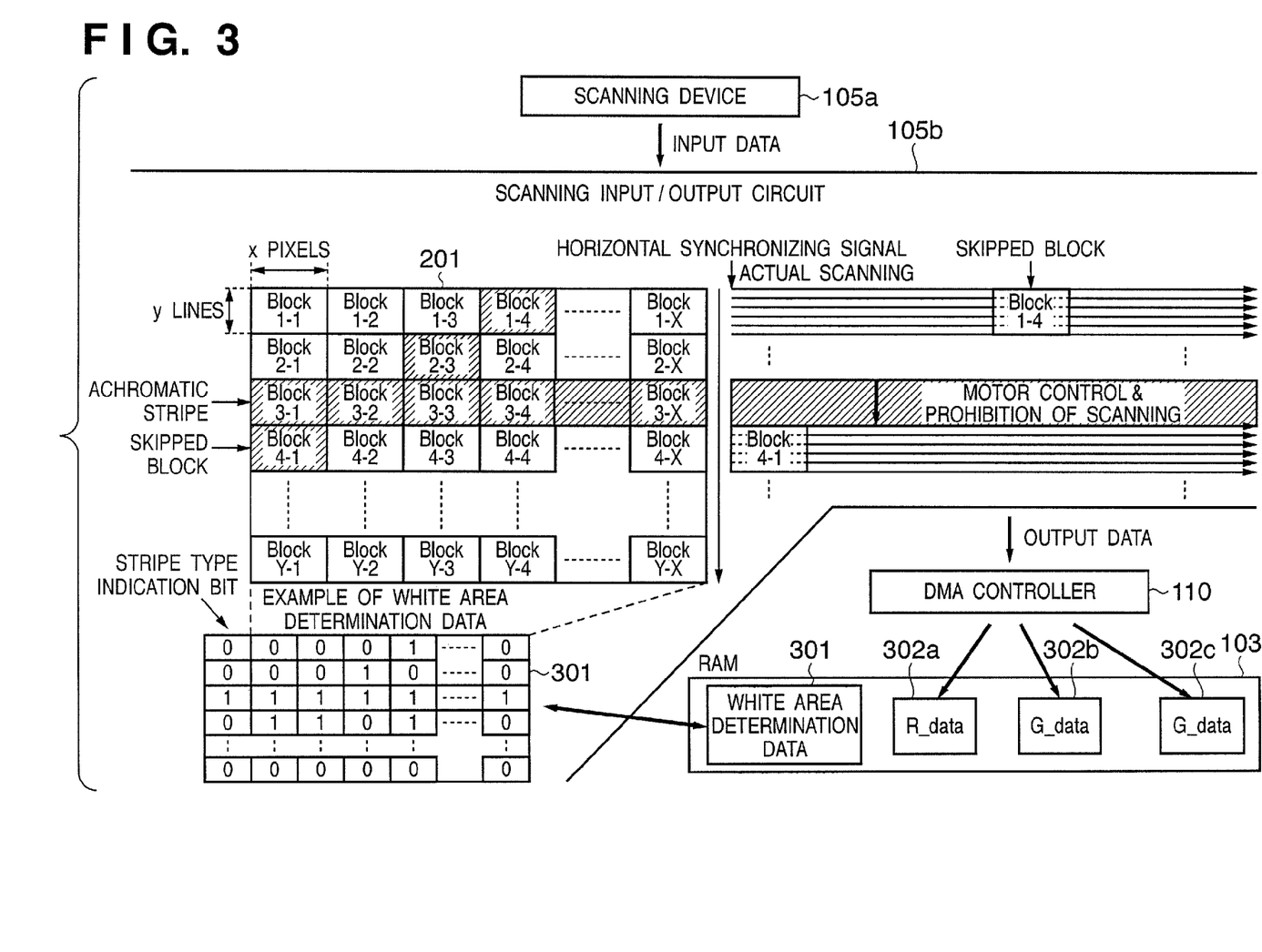
FIG. 3 is a diagram schematically showing that white area determination data is generated from the prescan image data and actual scanning is performed based on the white area determination data.

FIG. 3 is a diagram schematically showing that white area determination data 301 is generated from the prescan image data 201 and actual scanning is performed based on the white area determination data 301. In FIG. 3, the scanner unit 105 of FIG. 1 is divided into a scanning device 105a and a scanning input/output circuit 105b.

The scanning device 105a includes a CCD or CIS for scanning the original and outputting an RGB analog signal. The scanning device 105a further includes an AFE (analog front end) device for A/D converting an analog signal to a digital signal.

The scanning input/output circuit 105b captures an output signal (image data) from the scanning device 105a and expands (buffers) image data in the RAM 103. Further, the scanning input/output circuit 105b has a control signal output function for controlling the scanning device 105a, a control signal output function for controlling an AFE which A/D converts an output signal from the scanning device 105a, and a dimming control function for a sensor light source for a CCD or CIS. Moreover, the scanning input/output circuit 105b has a feedback PWM control function performed based on inputted image data, a generation function of a horizontal synchronizing signal for specifying horizontal synchronization of scanning, and a control function for controlling the start and end of scanning. Additionally, the scanning input/output circuit 105b has a signal generation function for an interrupt synchronized with the horizontal synchronizing signal for motor control or the like which moves the scanner head, and a setting function for a scanned area captured from the scanning device. Besides, the scanning input/output circuit 105b has a white adding function of adding white data to a predetermined segment in the main scanning direction, a white mask function of skipping white data of a predetermined segment in the main scanning direction, a shading function, and so on.

When prescanning is performed by the scanning device 105a, the scanning input/output circuit 105b obtains the prescan image data 201. The size of each block of the prescan image data 201 is x pixels in the main scanning direction and y lines in the sub scanning direction.

The scanning input/output circuit 105b generates the white area determination data 301 from the prescan image data 201. The white area determination data 301 is simplified such that a white area block in the prescan image data 201 is represented as 1 and a block other than a white area is represented as 0. Further, the white area determination data 301 has a stripe type indication bit. In a white stripe in which all the blocks in the main scanning direction are 1 (white area), the stripe type indication bit is 1. "stripe type" means the kind of each stripe (in this case, whether a stripe is white or not).

Thus the white area determination data 301 is generated.

The following will describe actual scanning by the MFP 100.

In the actual scanning, an image is scanned with a higher resolution than that of prescanning. Therefore, in the original, an area corresponding to each block of the prescan image data 201 has more pixels than "x pixels×y lines=xy pixels."

Actual input data from the scanning device 105a is not inputted in blocks but in lines. The data is made up of all pixels consecutively arranged in the main scanning direction. Thus the scanning input/output circuit 105b calculates, based on the white area determination data 301, the starting and end positions of skipping image scanning in the main scanning direction, and does not obtain data of an area corresponding to a calculated segment (prohibits acquisition).

When the white area determination data 301 has a stripe type indication bit of 1, the scanning input/output circuit 105b increases the speed of the scanner head to skip the stripe at high speed, in addition to the prohibition of data acquisition. Then, the scanning input/output circuit 105b reduces the speed of the scanner head and scanning is continued at a speed before acceleration.

At the completion of scanning, the scanning input/output circuit 105b stores obtained image data (scan image data) in the RAM 103 through the DMA controller 110. In the RAM 103, R component data (R_data) 302a, G component data (G_data) 302b, and B component data (B_data) 302c of the scan image data are stored separately. The order of stored data, an address, and so on can be set with a given bit length according to the design and setting of the MFP 100. The LSB, MSB, and so on can be also changed.

<Detail of Digital Image Processing>

Figure 4:
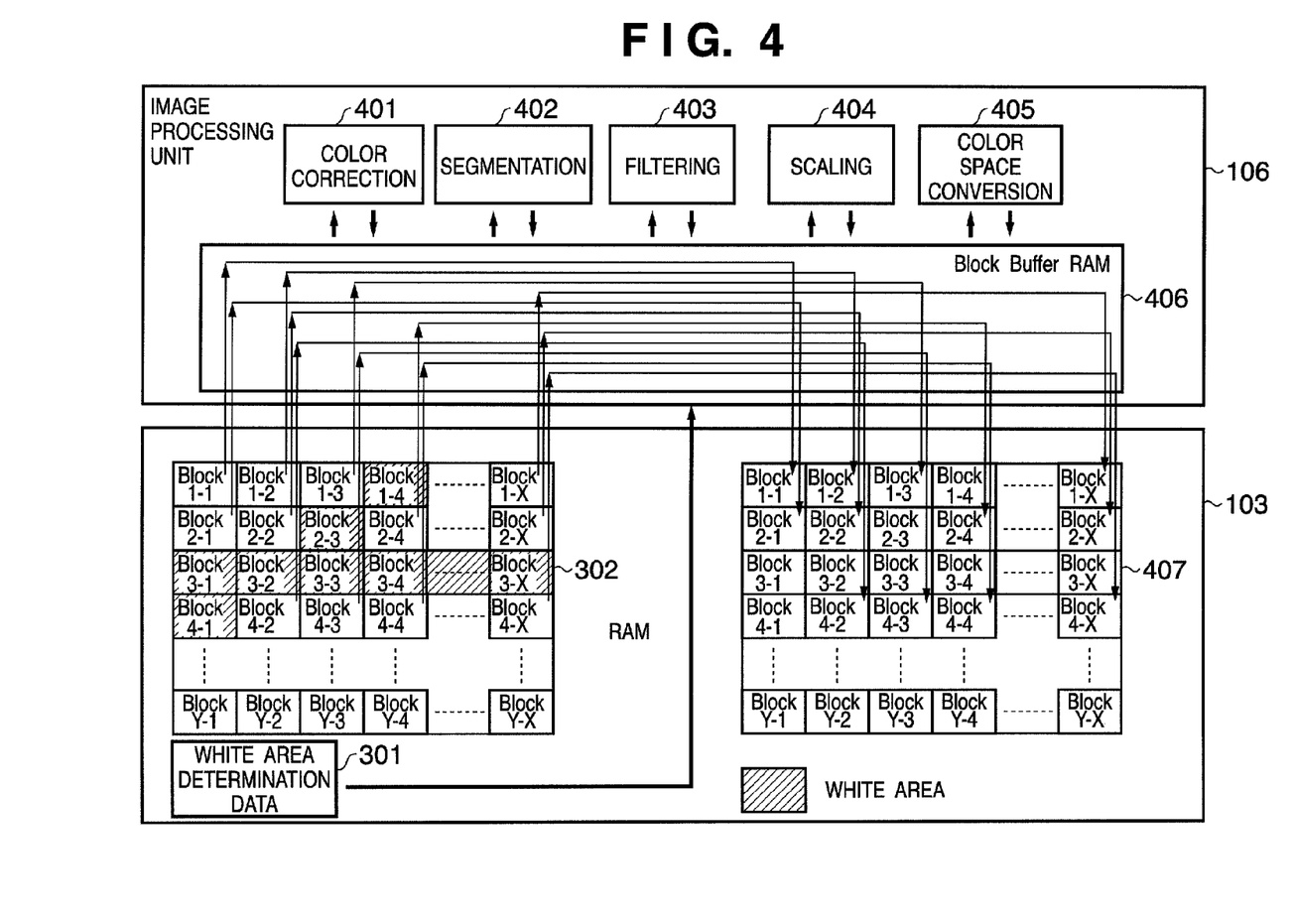
FIG. 4 is a diagram showing the detail of processing for digital image processing on scan image data.

FIG. 4 is a diagram showing the detail of processing for digital image processing on scan image data 302. First, the internal configuration of the image processing unit 106 will be described below.

A color correction part 401 performs γ correction, input data masking/blocking for color correction of RGB, and so on. γ correction is performed separately on R, G, and B by using, for example, an LUT (lookup table).

A segmentation part 402 discriminates between pixels of texts, outlines, and so on in an image based on input of RGB image data having a predetermined number of bits.

A filtering part 403 corrects a phenomenon such as a reduction in contrast and the occurrence of a blur by means of an MTF (modulation transfer function) correction filter. Such a phenomenon occurs when an interval between black and white decreases in image data. Further, the filtering part 403 performs filtering in the main scanning direction to reduce moiré, edge enhancement of lightness component (L) of an image, enhancement of saturation (Ca, Cb), and so on.

A scaling part 404 scales up or down image data through linear correction or the like.

A color space conversion part 405 converts multivalued image data of RGB to L, Ca, and Cb signals and further converts the data to YCbCr signal, sRGB signal, sYCbCr signal, and so on.

In block buffer RAM 406, unlike a conventional configuration in which each image processing unit includes a line buffer, image processing units sequentially perform image processing on image data in a buffer by means of shared memory called an image block buffer. It is thus possible to reduce the capacity of the buffer RAM necessary for image processing. As for image data having been expanded in the block buffer RAM 406, image data in blocks is transferred to each image processing unit and processed therein, so that the block buffer RAM 406 can be configured with the minimum memory capacity for processing image data.

Processed image data 407 is image data obtained after the image region (blocks) of the scan image data 302 is transferred to the block buffer RAM 406 and is processed by the foregoing image processing described above.

<Detail of Motor Speed Control of the Scanner Unit 105>

Figure 5:
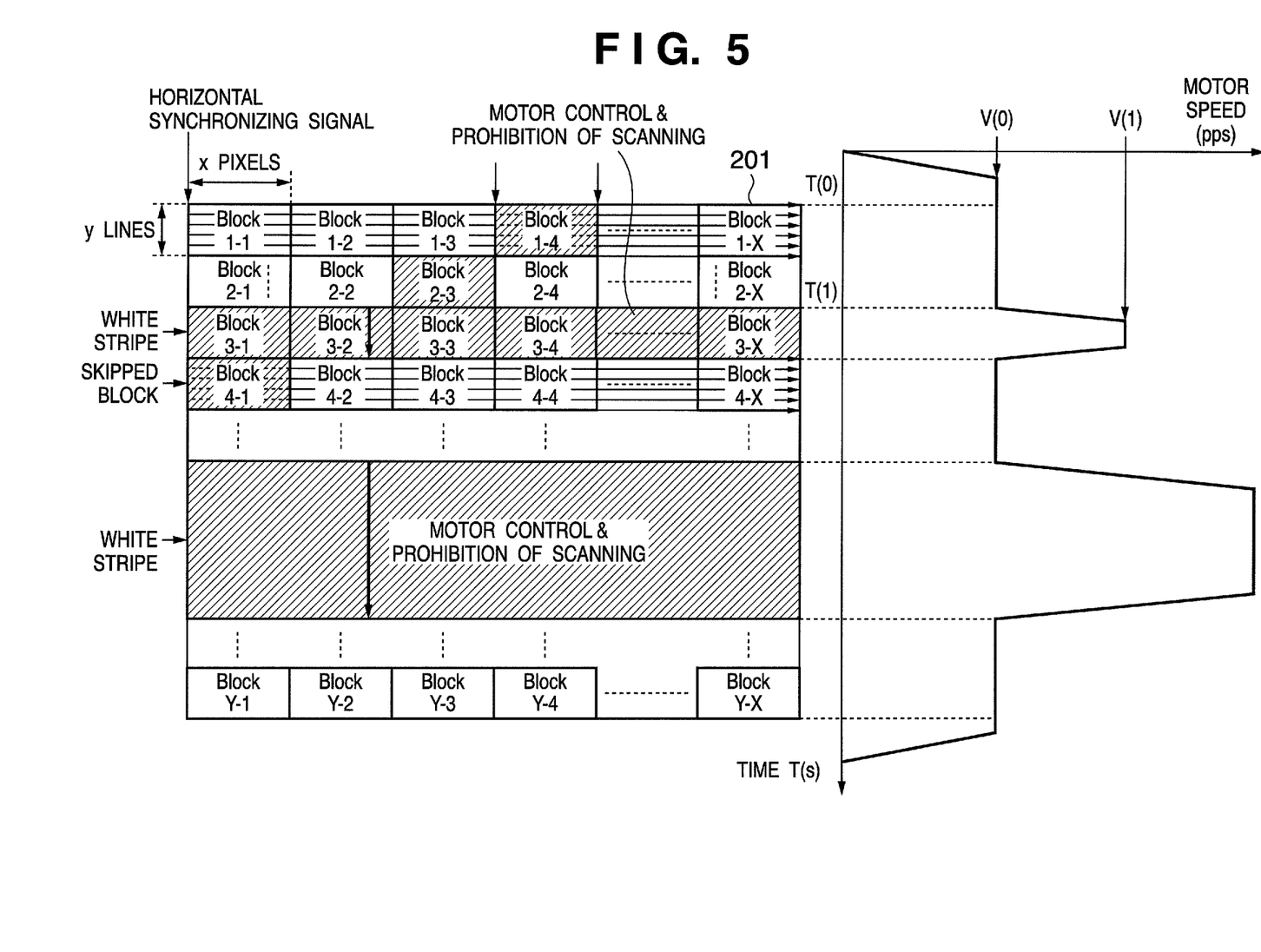
FIG. 5 is a diagram showing the detail of motor speed control of a scanner unit, the motor speed control being performed by a scanning input/output circuit based on the prescan image data.

FIG. 5 is a diagram showing the detail of motor speed control of the scanner unit 105. The motor speed control is performed by the scanning input/output circuit 105b of FIG. 3 based on the prescan image data 201. In this case, motor speed control means scanning speed control of the scanner head. In FIG. 5, the prescan image data 201 is illustrated to clarify scanning of an original having a predetermined size. In reality, the scanning input/output circuit 105b performs motor speed control using the white area determination data 301 of FIG. 3.

When the scanner unit 105 receives an instruction to start scanning from the operation unit 108 or the like at time T(0) of FIG. 5, the scanning input/output circuit 105b drives the motor of the scanner unit 105 at a speed suitable for a set scanning resolution. "At a speed suitable for a resolution" means that the higher the resolution is, the scanner head is moved at lower speed, that is, the lower the resolution is, the scanner head is moved at higher speed. The motor is driven accordingly. This speed is represented as V(0) in FIG. 5.

In the case where the white area determination data 301 includes a stripe (white stripe) having a stripe type indication bit of 1 at time T(1), the scanning input/output circuit 105b accelerates the motor to speed V(1). The speed V(1) is determined based on the number of consecutive stripes having stripe type indication bits of 1. This is because after the scanner head passes through white stripes, the motor has to be returned to the original speed, and thus when the number of consecutive white stripes is small, the motor speed cannot be considerably increased. On the contrary, the larger the number of consecutive white stripes is, the motor can be driven at higher speed. As a matter of course, the motor cannot be accelerated more than the performance of the motor.

As described above, the scanning input/output circuit 105b increases the motor speed during the scanning of white stripes, shortening scanning time and enabling high-speed image scanning.

<Flow of Scanning>

Figure 6:
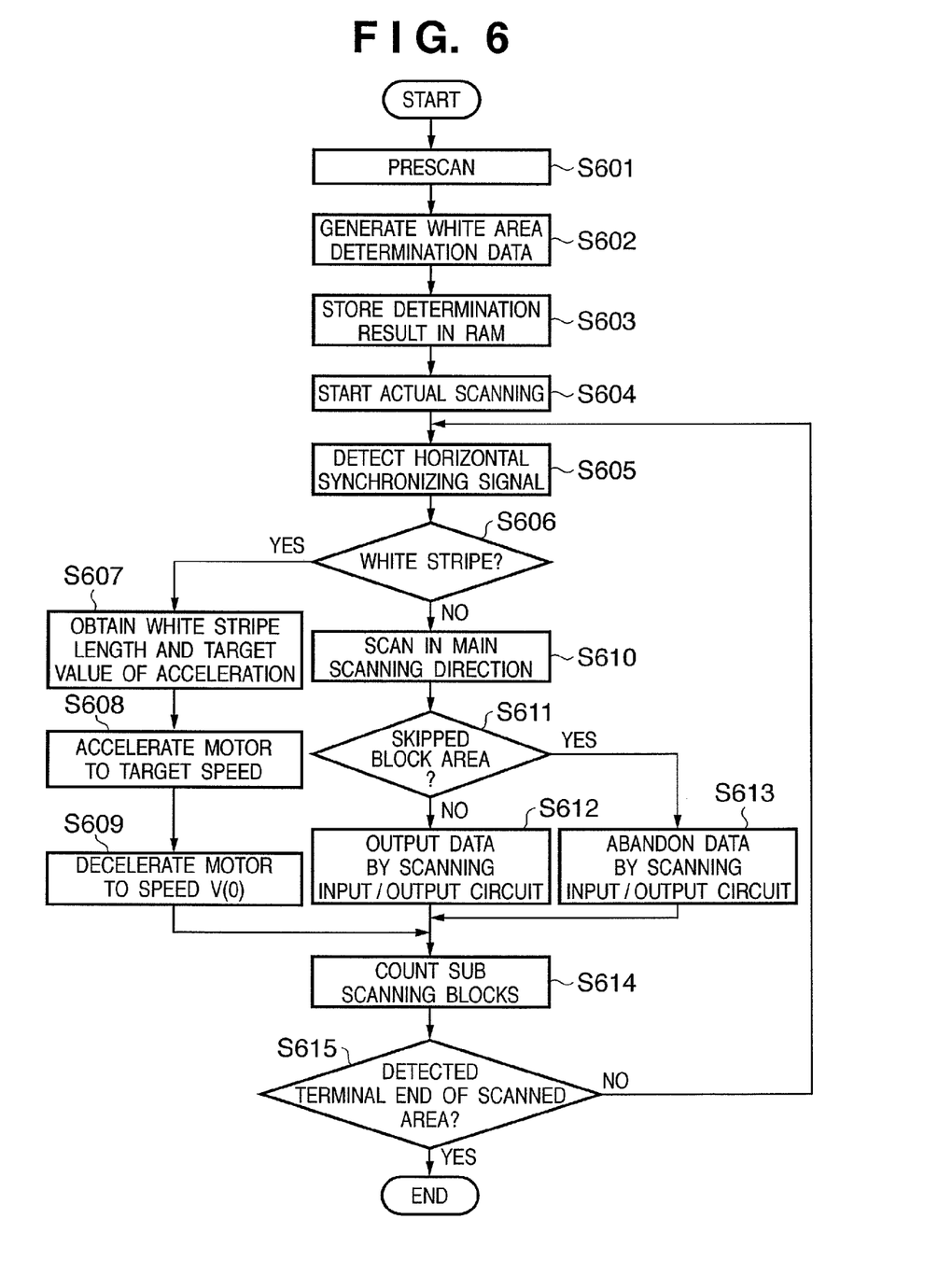
FIG. 6 is a flowchart showing the flow of scanning according to First Embodiment.

FIG. 6 is a flowchart showing the flow of scanning according to First Embodiment. When the scanner unit 105 receives an instruction to start scanning from the operation unit 108 or the like, this processing is started.

In step S601, the scanner unit 105 performs prescanning. The scanner unit 105 obtains the foregoing prescan image data 201 through the prescanning, and stores the data in the RAM 103.

In step S602, the scanning input/output circuit 105b generates the white area determination data 301 based on the prescan image data 201.

In step S603, the scanning input/output circuit 105b stores the generated white area determination data 301 in the RAM 103.

In step S604, the scanner unit 105 starts actual scanning. The following steps S605 to S615 describe the actual scanning. During the actual scanning, the scanning input/output circuit 105b drives the motor at a speed (V(0) of FIG. 5) suitable for a scanning resolution in areas other than white stripes.

In step S605, the scanner unit 105 detects a horizontal synchronizing signal.

In step S606, the scanning input/output circuit 105b refers to the white area determination data 301 and determines whether the currently scanned area (the position of the scanner head) is on a white stripe or not. When the currently scanned area is on a white stripe, the process advances to step S607. When the currently scanned area is not on a white stripe, the process advances to step S610.

In step S607, the scanning input/output circuit 105b refers to the white area determination data 301 and obtains the number of consecutive white stripes. Further, the scanning input/output circuit 105b calculates a target value of acceleration of the motor based on the number of consecutive white stripes.

In step S608, the scanning input/output circuit 105b accelerates the motor to the target speed and skips the white stripes at high speed. Near the end of the white stripes, the process advances to step S609.

In step S609, the scanning input/output circuit 105b reduces the speed of the motor to V(0). Then, the process advances to step S614.

When it is determined in step S606 that the currently scanned area is not present on a white stripe, processing from step S610 is performed as described above.

In step S610, the scanner unit 105 performs scanning in the main scanning direction.

In step S611, the scanning input/output circuit 105b refers to the white area determination data 301 and detects a skipped block area from the areas having been scanned in step S610. For areas other than the skipped block area, in step S612, the scanning input/output circuit 105b expands in the RAM 103, data having been scanned in step S610. For the skipped block area, in step S613, the scanning input/output circuit 105b abandons data having been scanned in step S610.

It should be noted that the processing of steps S611 to S613 is individually performed on each block in the main scanning direction.

In step S614, the scanning input/output circuit 105b counts the number of scanned blocks in the sub scanning direction.

In step S615, the scanning input/output circuit 105b determines whether the terminal end (lower end block) of the scanned area of the original is scanned or not based on the number of blocks having been counted in step S614. When the lower end block is not scanned, the process returns to step S605 and scanning is continued. When the lower end block is scanned, scanning is completed.

As described above, according to the present embodiment, the scanner unit performs prescanning and generates white area determination data. Then, the scanner unit refers to the white area determination data to detect a white stripe during actual scanning, and drives the motor at high speed on the stripe.

Thus, the scanner unit can perform high-speed scanning when scanning an image having a large white area (many white stripes).

Second Embodiment

In First Embodiment, the MFP 100 of FIG. 1 generates the white area determination data 301 of FIG. 3 only based on a determination whether the prescan image data 201 of FIG. 2 is a white area or not, and the scanning speed is increased. In Second Embodiment, the area type of each block of prescan image data 701 (FIG. 7) is determined. The area type includes an area including only a text, an area including only an image, and a mixed region including a text and an image. In the explanation of the present embodiment, as described above, an "image" includes a "text image" in principle and an "area only including an image" and an "image region" include no text image.

In the present embodiment, a scanner unit 105 determines a scanning resolution based on an area type (to be precise, a stripe type generated based on the area type), so that the scan image data 302 (FIG. 3) is obtained with high image quality.

Further, in the present embodiment, an MFP 100 may be identical in configuration to that of First Embodiment and thus the explanation thereof is omitted.

<Area Type Determination Data 702 and Actual Scanning>

Figure 7:
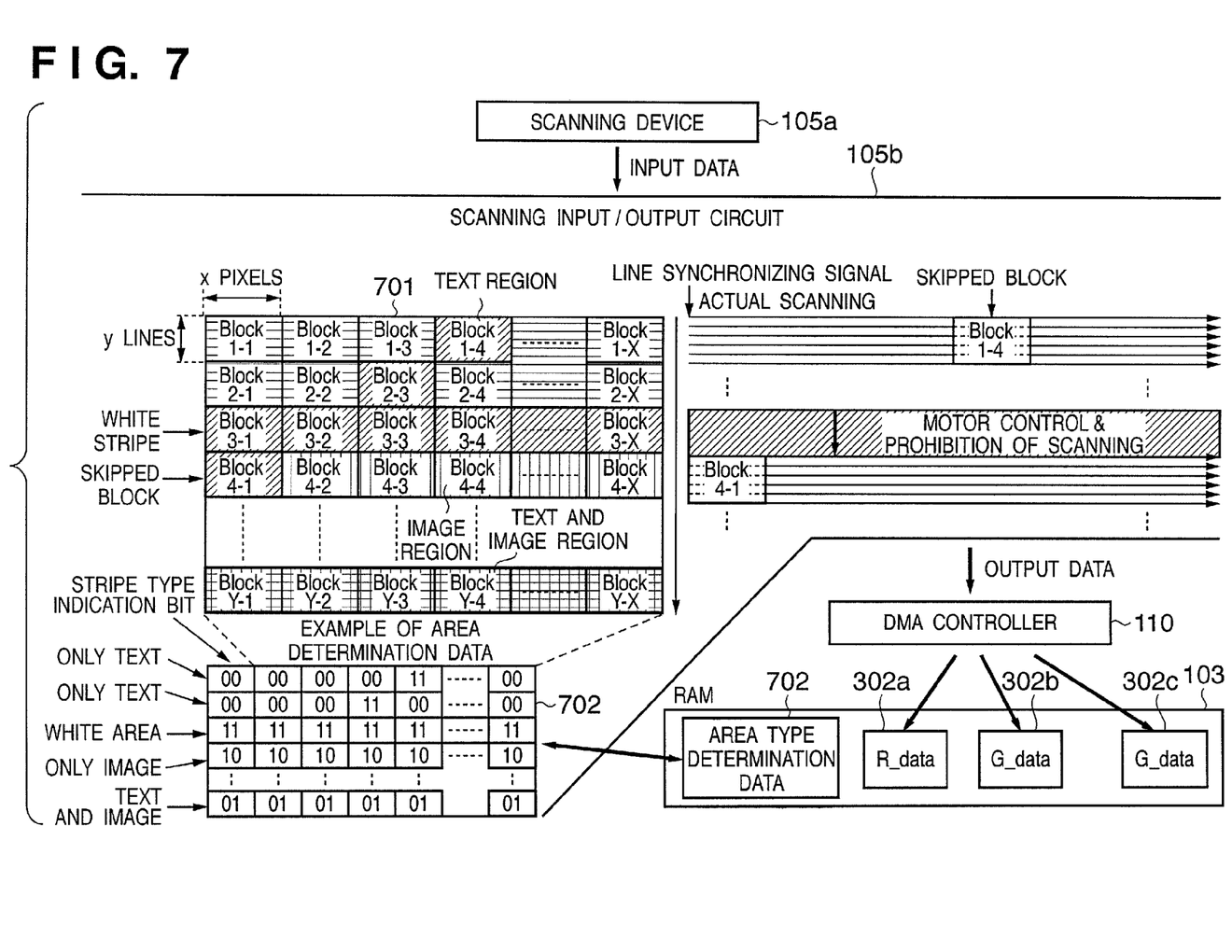
FIG. 7 is a diagram schematically showing that area type determination data is generated from the prescan image data and actual scanning is performed based on the area type determination data.

FIG. 7 is a diagram schematically showing that area type determination data 702 is generated from the prescan image data 701 and actual scanning is performed based on the area type determination data 702.

The prescan image data 201 of FIG. 2 is used only for determining whether each block of x pixels–y lines of an original is a white area or not. However, the prescan image data 701 is used not only for determining whether each block is a white area or not but also for determining whether an area other than a white area includes only a text, an image, or both of a text and an image. This determination can be made by the segmentation part 402 of FIG. 4 using any known technique.

A scanning input/output circuit 105b generates the area type determination data 702 from the prescan image data 701. The area type determination data 702 is simplified such that a block of a white area in the prescan image data 701 is represented as 11, an area including only a text is represented as 00, an area including only an image is represented as 10, and a mixed region including a text and an image is represented as 01.

Further, the area type determination data 702 has a stripe type indication bit. When blocks in the main scanning direction are all 11 (white area), the stripe type indication bit also has 11. As in First Embodiment, a stripe having a stripe type indication bit of 11 is a white stripe. Moreover, when areas other than a white area are all image regions in blocks arranged in the main scanning direction, the stripe type indication bit has 10 and the stripe is called an image stripe. When areas other than a white area are all text regions in blocks arranged in the main scanning direction, the stripe type indication bit has 00 and the stripe is called a text stripe. When blocks arranged in the main scanning direction include a text region and an image region or include a mixed region of a text and an image, the stripe type indication bit has 01 and the stripe is called a mixed stripe.

In other words, in the present embodiment, four stripe types of a white stripe, a text stripe, an image stripe, and a mixed stripe are available.

Thus the area type determination data 702 is generated.

The following will describe actual scanning of the MFP 100.

Actual input data from the scanning device 105a is not inputted in blocks but in lines. The data is made up of all pixels consecutively arranged in the main scanning direction. Thus the scanning input/output circuit 105b calculates, based on the area type determination data 702, the starting and end positions of skipping image scanning in the main scanning direction, and does not obtain data of a calculated segment.

When the area type determination data 702 has a stripe type indication bit of 11, the scanning input/output circuit 105b increases the speed of the scanner head to skip the stripe at high speed, in addition to the prohibition of data acquisition. Next, the scanning input/output circuit 105b reduces the speed of the scanner head and scanning is continued at a speed before acceleration.

Further, when the stripe type indication bit is 00 (text stripe), 01 (mixed stripe), and 10 (image stripe), the scanning input/output circuit 105b moves the scanner head at relatively high speed, medium speed, and low speed, respectively, to perform scanning. This is because texts forming a large proportion of an original do not seriously affect image quality even when scanning is performed with a relatively low resolution (at high speed).

In this way, the scanner unit 105 is intended both to increase the scanning speed and to improve the quality of a scanned image.

At the completion of scanning, the scanning input/output circuit 105b stores obtained image data (scan image data) in RAM 103 through a DMA controller 110. In the RAM 103, R component data (R_data) 302a, G component data (G_data) 302b, and B component data (B_data) 302c of scan image data are stored separately.

<Detail of Motor Speed Control of the Scanner Unit 105>

Figure 8:
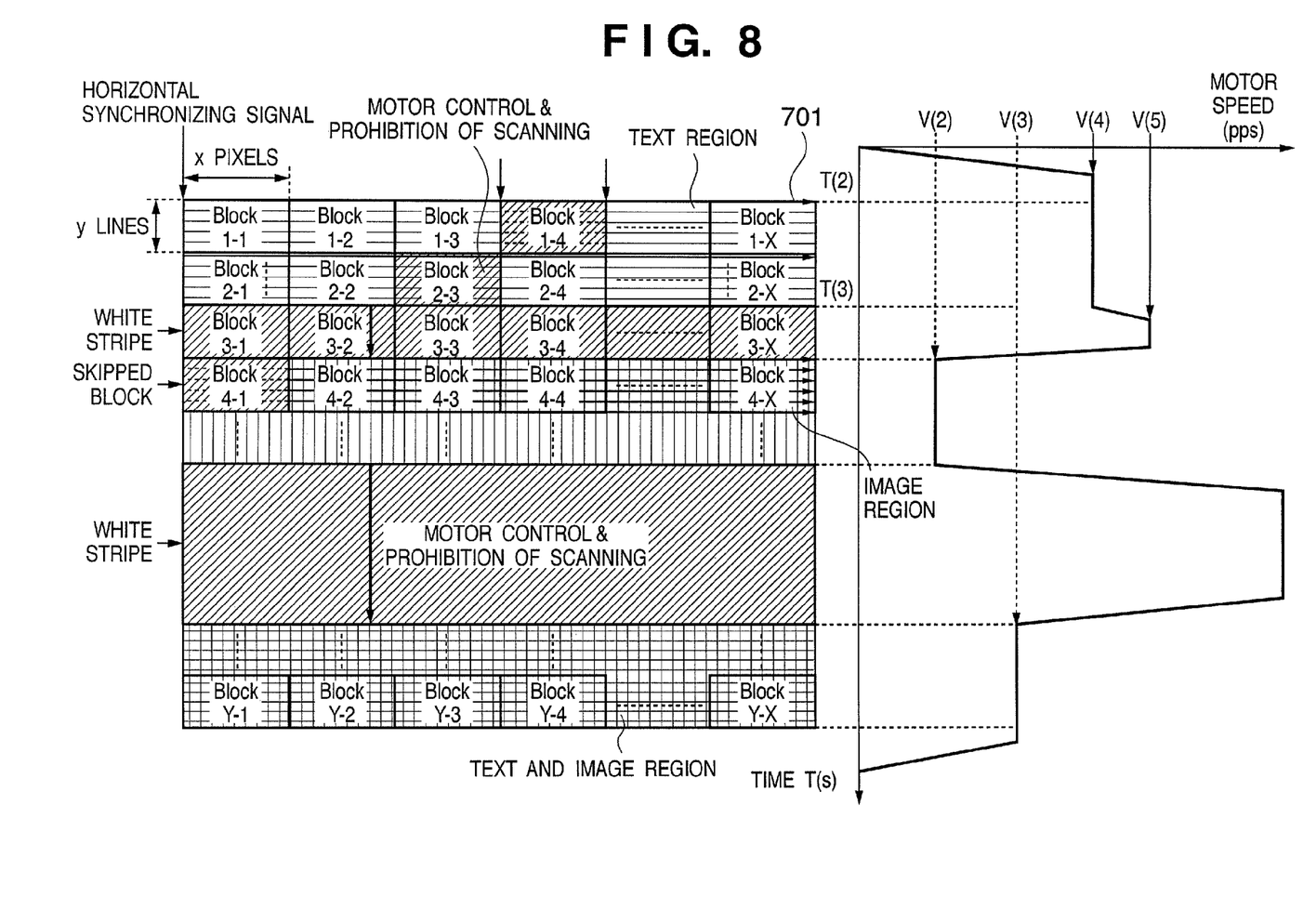
FIG. 8 is a diagram showing the detail of motor speed control of a scanner unit, the motor speed control being performed by the scanning input/output circuit of FIG. 7 based on the prescan image data.

FIG. 8 is a diagram showing the detail of motor speed control of the scanner unit 105. The motor speed control is performed by the scanning input/output circuit 105b of FIG. 7 based on the prescan image data 701 obtained by prescanning. In this case, the motor speed control means speed control of the scanner head. In FIG. 8, the prescan image data 701 is illustrated to clarify scanning of an original having a predetermined size. In reality, the scanning input/output circuit 105b performs motor speed control using the area type determination data 702 of FIG. 7.

When the scanner unit 105 receives an instruction to start scanning from the operation unit 108 or the like at time T(2) of FIG. 8, the scanning input/output circuit 105b drives the motor of the scanner unit 105 at a speed suitable for a set scanning resolution. "At a speed suitable for a resolution" means that the higher the resolution is, the scanner head is moved at lower speed, that is, the lower the resolution is, the scanner head is moved at higher speed. The motor is driven accordingly.

In First Embodiment, the scanning resolution is fixed, whereas the scanning resolution is variable in Second Embodiment because the motor speed is changed according to a stripe type as described above. The speed is represented as V(2) to V(4) in FIG. 8.

In the case where the area type determination data 702 includes a stripe (white stripe) having a stripe type indication bit of 11 at time T(3), the scanning input/output circuit 105b accelerates the motor to speed V(5). The speed V(5) is determined, as in First Embodiment, based on the number of consecutive stripes having the stripe type indication bits of 11.

When the stripe type indication bit is 00 (text stripe), 01 (mixed stripe), and 10 (image stripe), the motor speed is controlled so as to have scanning resolutions corresponding to the respective stripe types. The scanning resolutions corresponding to the respective stripe types may be determined by the MFP 100 during the design process and may be changed by the user through an operation unit 108.

As described above, the scanning input/output circuit 105b increases the motor speed during the scanning of white stripes, shortening scanning time and enabling high-speed scanning.

Further, a photographic image or the like is scanned with a high resolution (at low speed) and a text part is scanned with a lower resolution (at high speed), so that finally obtained image data has high image quality and the image scanning speed is increased.

Moreover, the scanner unit 105 calculates the time for scanning one page of an original based on a set resolution corresponding to a stripe type, and sets a resolution again based on a calculation result, so that the time for scanning one page can be always set within a predetermined time. For example, when the time for scanning exceeds the predetermined time, the scanner unit 105 sets a lower resolution.

<Flow of Scanning>

Figure 9:
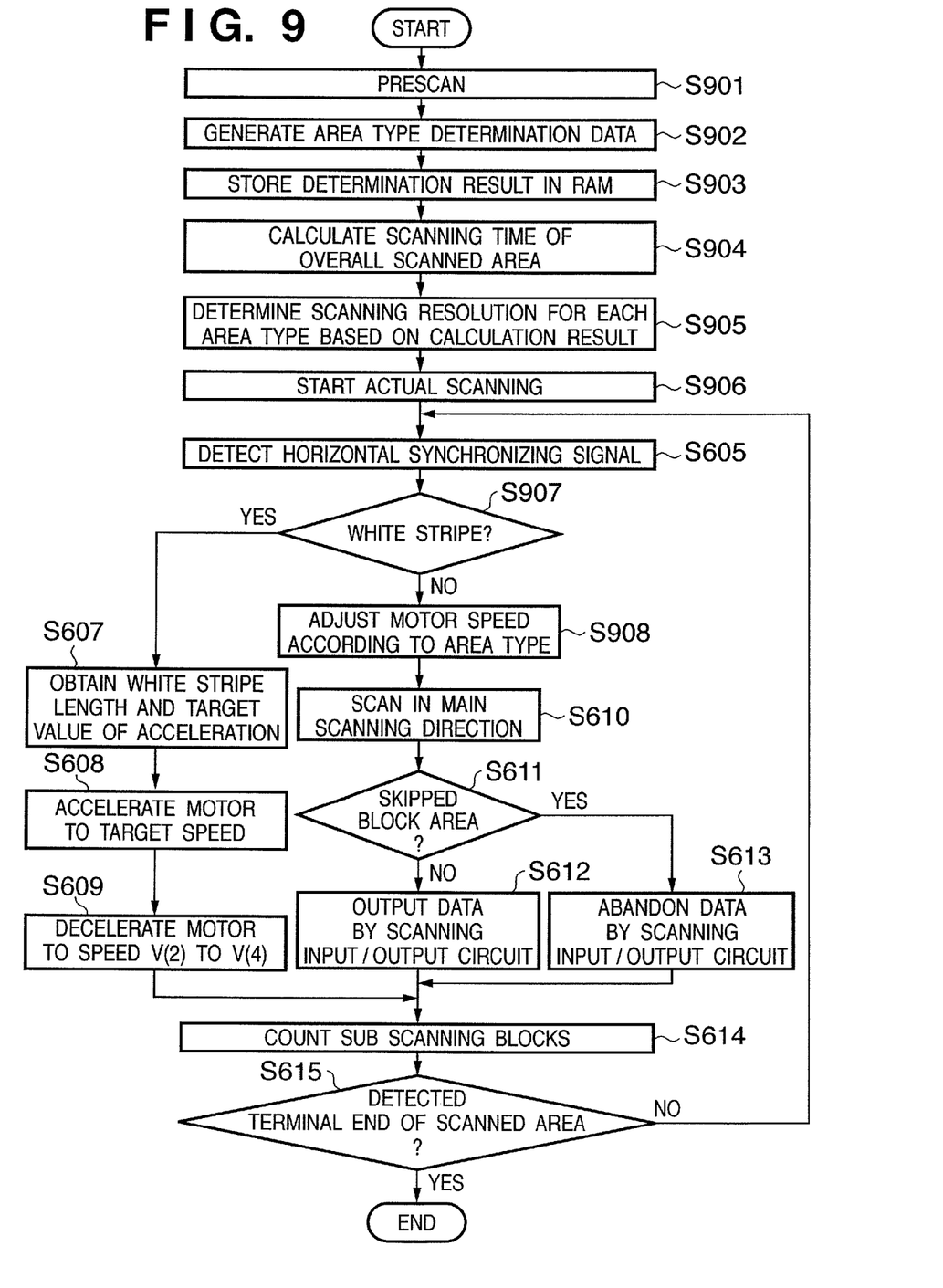
FIG. 9 is a flowchart showing the flow of scanning according to Second Embodiment.

FIG. 9 is a flowchart showing the flow of scanning according to Second Embodiment. When the scanner unit 105 receives an instruction to start scanning from the operation unit 108 or the like, this processing is started. The same steps as those of First Embodiment (FIG. 6) are indicated by the same reference numerals and the explanation thereof is omitted.

In step S901, the scanner unit 105 of FIG. 1 performs prescanning. The scanner unit 105 obtains the prescan image data 701 of FIG. 7 through the prescanning, and stores the data in the RAM 103.

In step S902, the scanning input/output circuit 105b generates the area type determination data 702 based on the prescan image data 701.

In step S903, the scanning input/output circuit 105b stores the generated area type determination data 702 in the RAM 103.

In step S904, the scanning input/output circuit 105b calculates the time for scanning one page of the original based on the setting of a scanning resolution corresponding to a stripe type.

In step S905, the scanning input/output circuit 105b sets (changes) a scanning resolution corresponding to a stripe type, according to the time calculated in step S904.

In step S906, the scanner unit 105 starts actual scanning. The following steps describe the actual scanning. During the actual scanning, the scanning input/output circuit 105b drives the motor at a speed (V(2) to V(4) of FIG. 8) suitable for a resolution corresponding to a stripe type in stripes other than white stripes.

In step S907, the scanning input/output circuit 105b refers to the area type determination data 702 and determines whether the currently scanned area is on a white stripe portion or not. When the currently scanned area is on a white stripe, the process advances to step S607. When the currently scanned area is not on a white stripe, the process advances to step S908.

In step S908, the scanning input/output circuit 105b refers to the area type determination data 702 and adjusts the motor speed so as to have a resolution corresponding to the stripe type of a stripe type indication bit.

The following processing is similar to that of First Embodiment. Scanning is continued to the lower end block of the original.

Figure 10:
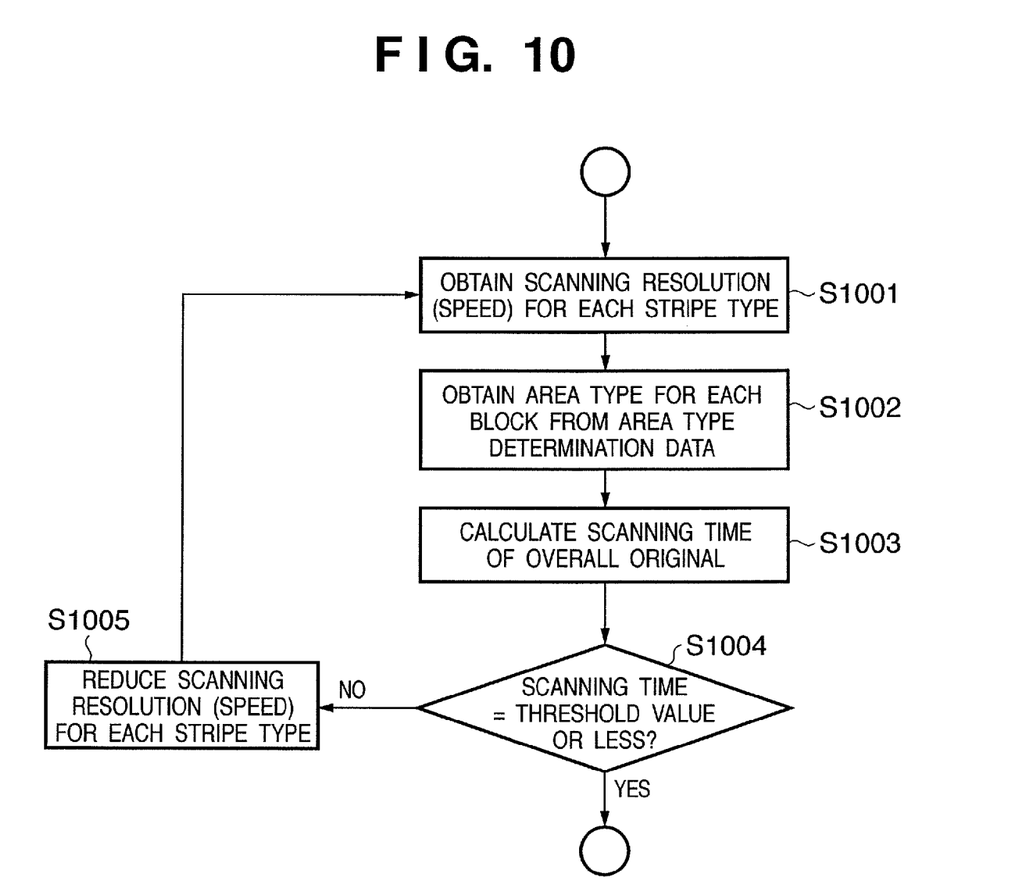
FIG. 10 is a flowchart showing the detail of determination of a scanning resolution corresponding to a stripe type in steps S904 and S905 of FIG. 9.

FIG. 10 is a flowchart showing the detail of determination of a scanning resolution corresponding to a stripe type in steps S904 and S905 of FIG. 9.

In step S1001, the scanning input/output circuit 105b obtains a scanning resolution for each stripe type. The scanning resolution for each stripe type can be recorded in SRAM or the like (not shown) of the MFP 100.

In step S1002, the scanning input/output circuit 105b obtains, from the area type determination data 702, an area type for each block of the original.

In step S1003, the scanning input/output circuit 105b calculates the time for scanning the overall original, based on a scanning resolution for each stripe type and an area type for each block of the original.

In step S1004, the scanning input/output circuit 105b determines whether the value calculated in step S1003 is equal to or lower than a predetermined threshold value. The threshold value can be recorded in SRAM or the like (not shown) of the MFP 100 and can be set during the design process of the MFP 100 or through the operation unit 108 operated by the user. When the calculated value is equal to or lower than the predetermined threshold value, the processing is completed. When the value exceeds the predetermined threshold value, the process advances to step S1005.

In step S1005, the scanning input/output circuit 105b reduces, at a predetermined rate, a scanning resolution for each stripe type. Next, the process returns to step S1001 and the foregoing processing is repeated.

In this way, the final scanning resolution for each stripe type is set such that the time for scanning the overall original is equal to or lower than the predetermined threshold value.

As described above, according to the present embodiment, the area type determination data is used not only for determining whether each block is a white area or not but also for determining whether an area other than a white area includes only a text, an image, or both of a text and an image. When the stripe type indication bit is 00 (text stripe), 01 (mixed stripe), and 10 (image stripe), the scanner unit performs scanning at relatively high speed, medium speed, and low speed, respectively.

Thus in the original, a part whose resolution considerably affects image quality is scanned with a high resolution (at low speed) and other parts are scanned at high speed, so that both of improved image quality of images shown by obtained image data and increased scanning speed can be achieved.

Other Embodiment

In the processing of the embodiments, prescanning and actual scanning are opposite in scanning direction (the moving direction of the scanner head), so that the time for returning to the home position is omitted and the scanning speed can be increased.

Further, a printer unit 104 may be notified of a white area of an original beforehand and the white area may be shared. By synchronization with blank skipping of an inkjet printer engine, a printing process before determination of a raster skip can be omitted and print image data can be more efficiently processed.

In the processing of the embodiments, a system or an apparatus may be provided with a storage medium in which the program code of software for embodying functions is recorded. The computer (CPU or MPU) of the system or the apparatus reads out and runs the program code stored in the storage medium, so that the functions of the foregoing embodiments can be realized. In this case, the program code read out from the storage medium realizes the functions of the foregoing embodiments, and the storage medium in which the program code is stored is a constituent element of the present invention. The storage medium for supplying such a program code includes, for example, floppy® disk, a hard disk, an optical disk, and a magneto-optical disk. Alternatively, a CD-ROM, CD-R, a magnetic tape, a nonvolatile memory card, ROM, and so on can be used.

The functions of the foregoing embodiments are not realized only by running the program code read out by the computer. The functions of the foregoing embodiments are also realized by the following processing: an OS (operating system) or the like operating on the computer performs a part of actual processing or the overall processing based on the instruction of the program code.

Further, the program code read out from the storage medium may be written in memory included in an expansion board inserted in the computer or an expansion unit connected to the computer. After that, a CPU or the like included in the expansion board or the expansion unit performs a part of actual processing or the overall processing based on the instruction of the program code. The functions of the foregoing embodiments are also realized by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-267690, filed on Sep. 14, 2005, which is hereby incorporated by reference herein its entirety.

What is claimed is:

1. An image processing apparatus for scanning an image printed on an original and performing image processing, comprising:

a scanner having at least a scanning width corresponding to a width in a first direction of the original, a moving unit adapted to move the scanner in a second direction perpendicular to the first direction, a first scan control unit adapted to control the scanner and the moving unit to control a scanning operation such that the image is scanned with a first resolution, for each of a plurality of blocks obtained by dividing the image into the predetermined size blocks in the first direction and the second direction, a first determination unit adapted to determine whether an image in each of the plurality of blocks is blank or not, the blocks having been scanned under control of the first scan control unit, a second determination unit adapted to determine, based on a determination result of the first determination unit, whether the plurality of blocks include a blank stripe in which blocks in the first direction are all blank, a storage unit adapted to store determination results of the first and second determination units, and a second scan control unit adapted to control the scanning operation such that the image is scanned with a second resolution higher than the first resolution, wherein, with regard to consecutive blank stripes based on the determination result of the second determination unit, the determination result being stored in the storage unit, the second scan control unit controls the scanning operation such that the moving unit moves the scanner while skipping image scanning of the blank stripe at a first speed higher than a second speed without skipping image scanning, wherein the second scan control unit determines the first speed based on a length of the consecutive blank stripes and controls the moving unit to accelerate a speed of movement of the scanner from the second speed to the first speed, the acceleration being started at the beginning of the consecutive blank stripes, wherein the second scan control unit controls the scanning operation such that the moving unit decelerates the speed of movement of the scanner from the first speed to the second speed while maintaining the direction of movement in the second direction before the scanner reaches the end of the consecutive blank stripes, and wherein the acceleration and the deceleration of the speed of movement of the scanner are respectively performed only once for each single set of the consecutive blank stripes.

2. The image processing apparatus according to claim 1, wherein the second scan control unit further controls the scanning operation so as to skip image scanning on blank blocks, based on the determination result of the first determination unit, the determination result being stored in the storage unit.

3. The image processing apparatus according to claim 1, wherein the image is a color image, and the scanner and the moving unit are controlled by the first and second scan control units to perform the scanning operation, generating color image data represented by an RGB luminance component.

4. The image processing apparatus according to claim 3, wherein the first determination unit determines whether each of the plurality of blocks is white or not based on a value of the RGB color image data representing pixels of the color image, and determines whether an image in each of the plurality of blocks is blank or not based on the determination result.

5. The image processing apparatus according to claim 1, wherein when an image in the plurality of blocks is not blank, the first determination unit further determines a type of the image, the blocks having been scanned under control of the first scan control unit, the second determination unit further determines, based on the determination result of the first determination unit, whether the type is a predetermined combination making up a predetermined stripe type in the first direction, and the second scan control unit further determines the second resolution based on the determination result of the second determination unit.

6. The image processing apparatus according to claim 5, wherein the type indicates which one of a text region including only a text, an image region including only an object image, and a mixed region including a text region and an image region is present in the block.

7. The image processing apparatus according to claim 6, wherein the stripe type is a text stripe when all of the plurality of blocks other than a blank are the text regions in the first direction, the stripe type is an image stripe when all of the plurality of blocks other than a blank are the image regions in the first direction, and the stripe type is a mixed stripe when all of the plurality of blocks other than a blank include the text region and the image region or include the mixed region in the first direction.

8. The image processing apparatus according to claim 7, wherein when the stripe types to be scanned are the text stripe, the mixed stripe, and the image stripe, the second scan control unit sets the second resolution from lower to higher in this order.

9. The image processing apparatus according to claim 1, wherein the second scan control unit controls the moving unit such that the scanner moves opposite to a direction in which the first scan control unit moves the scanner in the second direction.

10. The image processing apparatus according to claim 1, further comprising:

a print unit adapted to move a printhead based on image data generated by the scanning operation under control of the second scan control unit, and to print an image on a printing medium, and a print control unit adapted to control the printhead so as to skip a printing operation of the printhead based on the determination results of the first and second determination units, the determination results being stored in the storage unit.

11. A control method for controlling an image processing apparatus for scanning an image printed on a medium while causing a moving unit to move a scanner in a second direction perpendicular to a first direction, the scanner having at least a scanning width corresponding to a width in the first direction of the medium, the method comprising the steps of:

controlling the scanner and the moving unit to control a scanning operation such that the image is scanned with a first resolution, for each of a plurality of blocks obtained by dividing the image into the predetermined size blocks in the first direction and the second direction, determining whether an image in each of the plurality of blocks is blank or not, the blocks having been scanned by the scanning operation, determining, based on the determination result, whether the plurality of blocks include a blank stripe in which blocks in the first direction are all blank, storing determination results of the two determination steps in memory, and controlling the scanning operation such that the image is scanned with a second resolution higher than the first resolution, wherein, with regard to consecutive blank stripes based on the determination results stored in the memory, the step of controlling the scanning operation controls the moving unit to move the scanner, while skipping image scanning of the blank stripe, at a first speed higher than a second speed without skipping image scanning, wherein the second scan control unit determines the first speed based on a length of the consecutive blank stripes and controls the moving unit to accelerate a speed of movement of the scanner from the second speed to the first speed, the acceleration being started at the beginning of the consecutive blank stripes, wherein the second scan control unit controls the scanning operation such that the moving unit decelerates the speed of movement of the scanner from the first speed to the second speed while maintaining the direction of movement in the second direction before the scanner reaches the end of the consecutive blank stripes, and wherein the acceleration and the deceleration of the speed movement of the scanner are respectively performed only once for each single set of the consecutive blank stripes.

12. A computer program, stored in a computer-readable storage medium, for causing a computer to perform a control method for controlling an image processing apparatus for scanning an image printed on a medium while causing a moving unit to move a scanner in a second direction perpendicular to a first direction, the scanner having at least a scanning width corresponding to a width in the first direction of the medium, said computer program comprising:

a module for controlling the scanner and the moving unit to control a scanning operation such that the image is scanned with a first resolution, for each of a plurality of blocks obtained by dividing the image into the predetermined size blocks in the first direction and the second direction, a module for determining whether an image in each of the plurality of blocks is blank or not, the blocks having been scanned by the scanning operation, a module for determining, based on the determination result, whether the plurality of blocks include a blank stripe in which blocks in the first direction are all blank, a module for storing determination results of the two determination modules in memory, and a module for controlling the scanning operation such that the image is scanned with a second resolution higher than the first resolution, wherein, with regard to consecutive blank stripes based on the determination results stored in the memory, the module for controlling the scanning operation controls the moving unit to move the scanner, while skipping image scanning of the blank stripe, at a first speed higher than a second speed without skipping image scanning, wherein the second scan control unit determines the first speed based on a length of the consecutive blank stripes and controls the moving unit to accelerate a speed of movement of the scanner from the second speed to the first speed, the acceleration being started at the beginning of the consecutive blank stripes, wherein the second scan control unit controls the scanning operation such that the moving unit decelerates the speed of movement of the scanner from the first speed to the second speed while maintaining the direction of movement in the second direction before the scanner reaches the end of the consecutive blank stripes, and wherein the acceleration and the deceleration of the speed of movement of the scanner are respectively performed only once for each single set of the consecutive blank stripes.

13. A computer-readable storage medium having a computer program stored thereon for controlling a computer to operate an image processing apparatus for scanning an image printed on a medium while causing a moving unit to move a scanner in a second direction perpendicular to a first direction, the scanner having at least a scanning width corresponding to a width in the first direction of the medium, wherein the program comprises:

a module for controlling the scanner and the moving unit to control a scanning operation such that the image is scanned with a first resolution, for each of a plurality of blocks obtained by dividing the image into the predetermined size blocks in the first direction and the second direction, a module for determining whether an image in each of the plurality of blocks is blank or not, the blocks having been scanned by the scanning operation, a module for determining, based on the determination result, whether the plurality of blocks include a blank stripe in which blocks in the first direction are all blank, a module for storing determination results of the two determination modules in memory, and a module for controlling the scanning operation such that the image is scanned with a second resolution higher than the first resolution, wherein, with regard to consecutive blank stripes based on the determination results stored in the memory, the module for controlling the scanning operation controls the moving unit to move the scanner, while skipping image scanning of the blank stripe, at a first speed higher than a second speed without skipping image scanning, wherein the second scan control unit determines the first speed based on a length of the consecutive blank stripes and controls the moving unit to accelerate a speed of movement of the scanner from the second speed to the first speed, the acceleration being started at the beginning of the consecutive blank stripes, wherein the second scan control unit controls the scanning operation such that the moving unit decelerates the speed of movement of the scanner from the first speed to the second speed while maintaining the direction of movement in the second direction before the scanner reaches the end of the consecutive blank stripes, and wherein the acceleration and the deceleration of the speed movement of the scanner are respectively performed only once for each single set of the consecutive blank stripes.

\* \* \* \* \*